US011974100B2

(12) United States Patent
Merkl et al.

(10) Patent No.: US 11,974,100 B2
(45) Date of Patent: Apr. 30, 2024

(54) HEARING DEVICE

(71) Applicant: Sivantos Pte. Ltd., Singapore (SG)

(72) Inventors: Tobias Merkl, Nuremberg (DE); Pascal Schreiber, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 157 days.

(21) Appl. No.: 17/828,215

(22) Filed: May 31, 2022

(65) Prior Publication Data

US 2022/0386047 A1 Dec. 1, 2022

(30) Foreign Application Priority Data

May 28, 2021 (DE) ..................... 10 2021 205 471.4

(51) Int. Cl.
*H04R 25/00* (2006.01)

(52) U.S. Cl.
CPC ........... *H04R 25/65* (2013.01); *H04R 25/604* (2013.01); *H04R 2225/025* (2013.01)

(58) Field of Classification Search
CPC ................ H04R 1/1016; H04R 1/1058; H04R 2225/0216; H04R 2225/025; H04R 25/602; H04R 25/604; H04R 25/609; H04R 25/65; H04R 25/652
See application file for complete search history.

(56) References Cited

U.S. PATENT DOCUMENTS

| | | | |
|---|---|---|---|
| 5,201,008 A | 4/1993 | Arndt et al. |
| 7,321,663 B2 | 1/2008 | Olsen |
| 2004/0107080 A1 | 6/2004 | Deichmann et al. |
| 2007/0230730 A1 | 10/2007 | Klemenz et al. |
| 2019/0110141 A1 | 4/2019 | Beyfuss et al. |

FOREIGN PATENT DOCUMENTS

| | | | |
|---|---|---|---|
| DE | 4125711 A1 * | 2/1993 | H04L 5/14 |
| EP | 0129788 A1 * | 1/1985 | H04R 25/609 |
| EP | 1626612 A2 | 2/2006 | |
| WO | 9847319 A1 | 10/1998 | |
| WO | 02071794 A1 | 9/2002 | |

* cited by examiner

*Primary Examiner* — Phylesha Dabney
(74) *Attorney, Agent, or Firm* — Laurence A. Greenberg; Werner H. Stemer; Ralph E. Locher

(57) ABSTRACT

A hearing device, in particular an in-the-ear hearing device, has a housing shell which encloses an electronics chamber like a cup. A cover plate is connected to the housing shell to terminate the electronics chamber. An electronics frame protrudes from the cover plate into the electronics chamber and by which an electric and/or an electronic component of the hearing device is reversibly mounted at least in directions parallel to the cover plate. At least one frame lock is reversibly coupled to the electronics frame, by which the electrical and/or electronic component is fixed on the electronics frame in a direction perpendicular to the cover plate.

13 Claims, 3 Drawing Sheets

HEARING DEVICE

CROSS-REFERENCE TO RELATED APPLICATION

This application claims the priority, under 35 U.S.C. § 119, of German Patent Application DE 10 2021 205 471.4, filed May 28, 2021; the prior application is herewith incorporated by reference in its entirety.

FIELD AND BACKGROUND OF THE INVENTION

The invention relates to a hearing device, in particular an in-the-ear hearing device.

Hearing devices are typically used to output a sound signal to the sense of hearing of the wearer of this hearing device. The output takes place by means of an output transducer, usually acoustically via airborne sound by means of a loudspeaker (also referred to as a "receiver"). Such hearing devices are often used in this case as so-called hearing aid devices (also in short: hearing aids). For this purpose, the hearing devices normally contain an acoustic input transducer (in particular a microphone) and a signal processor, which is configured to process the input signal (also: microphone signal) generated by the input transducer from the ambient sound with application of at least one signal processing algorithm typically stored specifically by user in such a way that a hearing impairment of the wearer of the hearing device is at least partially compensated for. In particular in the case of a hearing aid device, the output transducer can be, in addition to a loudspeaker, also alternatively a so-called bone vibrator or a cochlear implant, which are configured for mechanically or electrically coupling the sound signal into the sense of hearing of the wearer. The term hearing devices also additionally includes in particular devices, e.g., so-called tinnitus maskers, headsets, headphones, and the like.

Typical structural forms of hearing devices, in particular hearing aids, are behind-the-ear and in-the-ear hearing devices. These designations are directed to the intended wearing position. Thus, behind-the-ear hearing devices have a (main) housing, which is worn behind the pinna. It is possible to distinguish here between models, the loudspeaker of which is arranged in this housing. The sound output to the ear typically takes place by means of a sound tube which is worn in the auditory canal, and in models which have an external loudspeaker, which is placed in the auditory canal. In contrast, in-the-ear hearing devices have a housing which is worn in the pinna or even completely in the auditory canal.

In all cases, the miniaturization continuously progresses, in particular to further reduce the conspicuousness of the hearing devices and/or be able to integrate further functions in the respective housing. It is problematic here that the use of rechargeable energy storage devices is also being driven onwards, which also remain in the hearing device during the charging process. Such energy storage devices generally require an energy management electronics unit (in short: charging electronics unit), which is intended to control or regulate the energy output and, during the charging, the energy consumption. The unit usually formed from the energy storage device (generally a secondary cell) and the charging electronics unit is often also referred to as a "power module". If the power module is configured and provided for wireless charging, this is advantageous due to the saving of charging contact terminals in hearing devices, in particular hearing aids and preferably here in in-the-ear hearing aids, the power module often also contains an antenna, usually a coil, for wireless energy reception.

However, for such a power module it can be necessary to be able to remove it nondestructively from the hearing device for maintenance, replacement, or the like.

SUMMARY OF THE INVENTION

The invention is therefore based on the object of providing a maintenance-friendly hearing device.

This object is achieved according to the invention by a hearing device having the features of the independent claim. Advantageous embodiments and refinements of the invention, which are partially inventive as such, are represented in the dependent claims and the following description.

The hearing device according to the invention in particular represents an in-the-ear hearing device—preferably an in-the-ear hearing aid device (abbreviated: "ITE"). The hearing device has a housing shell, which encloses an electronics chamber like a cup, and which—in particular in the case of the ITE— is preferably worn at least partially in the auditory canal in the intended wearing state. Furthermore, the hearing device has a cover plate, which is connected to the housing shell to terminate (or: "close") the electronics chamber. In addition, the hearing device has an electronics frame, which protrudes from the cover plate into the electronics chamber and by means of which an electrical and/or electronic component of the hearing device is held reversibly at least in directions which extend in parallel to the cover plate. Furthermore, the hearing device has a frame lock reversibly coupled to the electronics frame, i.e., reversibly fixed on the electronics frame, by means of which the electrical and/or electronic component is fixed on the electronics frame in a direction which extends perpendicularly to the cover plate.

The frame lock is preferably (reversibly) fixed on the electronics frame or coupled thereto in such a way that the frame lock can also remain on the electronics frame independently of the presence of the electrical or electronic component, at least preferably is held in the direction perpendicular to the cover plate.

"Encloses like a cup" is understood here and hereinafter in particular to mean that the housing shell delimits the electronics chamber in at least five spatial directions. A possibly provided opening or a passage in the housing shell, for example, for the purpose of a line feedthrough or for a sound emission, in particular by means of a loudspeaker, is not excluded thereby, however. The sixth spatial direction is preferably kept open in the form of an installation opening, which is closed by means of the above-mentioned cover plate.

The electrical or electronic component is thus fixed by the electronics frame in parallel to the cover plate (and thus in four spatial directions). These four spatial directions are preferably denoted hereinafter as the x and y direction in the sense of a Cartesian coordinate system. In the fifth spatial direction (denoted hereinafter as the z direction), the fixing is carried out by the frame lock, which is in turn reversibly held on the electronics frame. Removing the electronic or electric component in the z direction is thus enabled by removing the frame lock, so that maintenance and/or replacement of this component is possible nondestructively.

For the case that the hearing device according to the invention is configured as an ITE, the cover plate is preferably a so-called faceplate.

In one expedient variant, the electronics frame is formed separately from the cover plate and is connected thereto—optionally permanently, i.e, irreversibly. Alternatively, the electronics frame is formed integrally, i.e., monolithically, with the cover plate, for example, by means of an injection molding method.

In one preferred embodiment, the electronics frame has multiple holding fingers, between which the above-mentioned component is secured in the x and y directions. These holding fingers preferably protrude in the z direction from the cover plate.

Furthermore, these holding fingers are preferably configured in such a way that they exert a clamping force on the component and preferably have to be deflected slightly to the side during the installation of the component, in particular toward the "rear side" and thus away from the component.

In one optional embodiment, the holding fingers already have means for at least slight formfitting mounting of the component in the z direction. These means are for example, a type of snap hooks or comparable elements which interact with the component.

The electronics frame preferably has three of these above-described holding fingers. The component can thus be held stably between the holding fingers, in particular for the case in which it has an (at least nearly) round external contour.

The above-described frame lock is reversibly fixed on one of the holding fingers at the end (in particular at the free end) in one preferred embodiment. In other words, the frame lock is thus arranged at the end of the corresponding holding finger facing away from the cover plate.

The frame lock is preferably fixed in a formfitting matter on the holding finger with action in the z direction, thus in particular cannot be removed in the z direction from the holding finger. In particular, the frame lock is coupled to the holding finger here in the manner of a dovetail connection. The frame lock or the holding finger has for this purpose a groove preferably oriented approximately radially in relation to the component, which in turn forms an undercut in the z direction. This undercut can be formed here as trapezoidal like a "classic" dovetail connection or also like a T-groove. The holding finger or the frame lock has a corresponding complementary element, which is thus inserted from the side, in particular from the rear side facing away from the component, of the frame lock or the holding finger into the corresponding groove. The frame lock can thus be connected comparatively easily to the holding finger after the installation of the component and the fixing of the component in the z direction can thus be effectuated.

The frame lock preferably has a lug or comparable element which is located above the component viewed in the z direction in the intended installation state and thus secures this component.

In a further expedient embodiment, the frame lock is locked on the holding finger and is thus secured against inadvertent removal. For example, in this case a projection is inserted in a corresponding recess of the above-described groove.

In one preferred embodiment, at least two of the above-described holding fingers each bear a frame lock.

For the above-described case that three (in particular precisely three) holding fingers are provided, a frame lock is expediently only arranged on two of these three holding fingers. In contrast, a holding lug active in the z direction is formed on the "other" holding finger, which in particular in the intended installation state protrudes over the component on the side of the component facing away from the cover plate (thus in particular protrudes on the radial inside). The component is thus pushed under this holding lug in the intended installation state. The two frame locks arranged on the other holding finger are thus also used as separate fixing elements for the purpose of avoiding bending of this holding finger during the installation of the component which goes beyond the load limits of the material forming the holding finger.

In a further preferred embodiment, the housing shell has one projection assigned to each holding finger on the inside, against which the corresponding holding finger is supported on the rear side—i.e., against "evading" or bending away from the component. In other words, these projections prevent the holding fingers in the intended installation state from being displaced, for example, due to shocks during the wearing of the hearing device, and thus releasing the component. In addition, this enables the holding fingers to be made comparatively thin-walled, so that they are essentially used in particular for positioning the component in the z direction and for absorbing traction forces in the z direction. The holding forces in the x and y direction required for the intended operation, in contrast, are taken over by the housing shell, which is typically comparatively stable in any case.

In a further expedient embodiment, which is used in particular for mounting multiple components by means of the above-described holding fingers, the or the respective frame lock has a holding device which is preferably configured in the form of a holding claw. This holding claw is preferably formed by the above-described lug, which is used for fixing or securing the component in the z direction, and a further lug spaced apart therefrom in the z direction. The further component can be introduced between these two lugs. The above-described "third" or other holding finger preferably also has, in addition to its holding lug, a further holding lug spaced apart in the z direction, which thus jointly form a holding claw permanently formed on this holding figure.

The above-described electrical or electronic component, which is held between the holding fingers, is preferably a rechargeable secondary cell, preferably the power module described at the outset. The further component is preferably a circuit carrier having electronic components arranged thereon, which form a signal processing unit of the hearing device. This component is also referred to as the "motherboard" (which in particular has a signal processor).

For the case in which multiple components are held by means of the electronics frame and the or the respective frame lock, these components can also advantageously be held in predetermined positions in relation to one another, in particular stacked in the z direction, and so they are removable in a simple manner.

The conjunction "and/or" is to be understood here and hereinafter in particular to mean that the features linked by means of this conjunction can be formed both jointly and also as alternatives to one another.

A "form fit" or a "formfitting connection" between at least two parts connected to one another is understood here and hereinafter in particular to mean that the parts connected to one another are held together at least in one direction by direct interlocking of contours of the parts themselves or by indirect interlocking via an additional connecting part. The "blocking" of a mutual movement in this direction thus takes place due to the form.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are always provided with the same reference signs in all figures.

Figure 1:
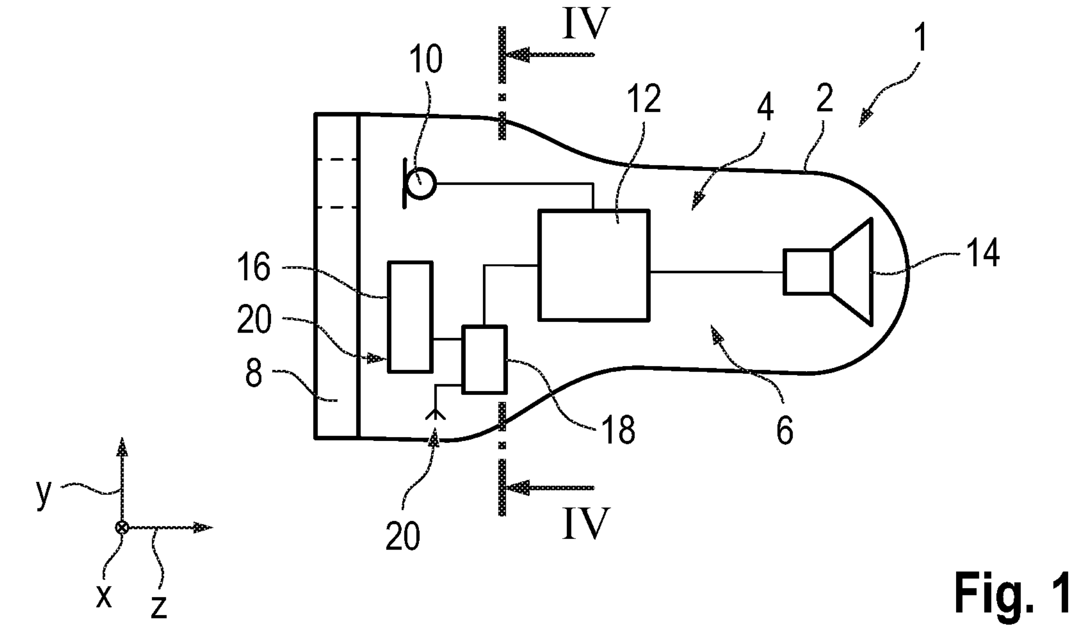
FIG. 1 is a schematic side view of a hearing device according to the invention.

Referring now to the figures of the drawings in detail and first, particularly to FIG. 1 thereof, there is shown schematically a hearing device, specifically a hearing aid device to be worn in the ear of a user, abbreviated: "ITE 1". The ITE 1 has a housing shell 2, which encloses an electronics chamber 4 having electrical and electronic components 6 arranged therein in the five spatial directions z, +x, −x, +y, and −y. For simplification, the spatial directions are denoted hereinafter in the meaning of a Cartesian coordinate system as the x direction, y direction, and z direction. The housing shell 2 is open in the sixth spatial direction to enable installation of the components 6. In the intended usage state shown, the electronics chamber 4 is closed using a cover plate, denoted here as "faceplate 8". The faceplate 8 is placed on the housing shell 2 and fixed thereon for this purpose.

For the intended operation, the ITE 1 contains as the electronic components 6 a microphone 10 for capturing ambient sound and converting it into microphone signals, a signal processing unit 12 (also referred to as a "controller") for processing the microphone signals, and a loudspeaker 14 for outputting the processed microphone signals. For the power supply of the component 6, the ITE 1 contains as a further component 6 a secondary cell 16, i.e., a rechargeable battery, a charging electronics unit 18 for regulating a voltage provided by the secondary cell 16 to an operating voltage value and for regulating a voltage supplied for charging to a charging voltage value (and for controlling or regulating a charging process as such). To make the charging of the secondary cell 16 particularly user-friendly, the ITE 1 also has an antenna 20 for wireless energy reception, specifically a coil for inductive charging. The secondary cell 16, the charging electronics unit 18, and the antenna 20 form a so-called power module 22.

To simplify the maintenance or the replacement of the power module 22, it is reversibly mounted in the electronics chamber 4. For this purpose, the ITE 1 has an electronics frame 24, which is fastened on the faceplate 8. In an alternative exemplary embodiment (not shown), the electronics frame 24 is formed integrally, i.e., monolithically, with the faceplate 8. The electronics frame 24 is used for mounting and positioning the components 6 in the electronics chamber 4.

The electronics frame 24 has three holding fingers 26 for mounting the power module 22. These are arranged in such a way that they accommodate the essentially, i.e., approximately round, specifically circularly cylindrical, power module 22 between them and prevent its movement in the x and y directions. One of the holding fingers 26 has a holding lug 28 on its free end facing away from the faceplate 8, which protrudes "radially" inward over the power module 22 in order to prevent its displacement in the z direction. The power module 22 and the holding fingers 26 are dimensioned so that during the installation of the power module 22, the holding fingers 26 are bent slightly toward the outside (radially outward) in the scope of their elasticity and thus exert a clamping force on the power module 22. Specifically, the power module 22 is pushed or "clicked" under the holding lug 28.

For further fixing of the power module 22 in the z direction, the ITE 1 also has two "frame locks 30". These are each reversibly connected to one of the two other holding fingers 26 and also have a holding lug 32, which protrudes radially inward over the power module 22.

The frame locks 30 are held in a formfitting manner in the z direction on the holding fingers 26. For this purpose, the frame locks 30 and the holding fingers 26 each have an element like a dovetail connection. Specifically, the holding fingers 26 have a T-groove 34 at the end. The frame locks 30 have a T-base 36, which is shaped complementary to the T-groove 34 and is pushed from the radial outside into the T-groove 34 to install the corresponding frame locks 30 (cf. FIG. 2, arrow). At the same time, the corresponding holding lug 32 is pushed over the power module 22 and thus fixes it in the z direction.

Figure 3:
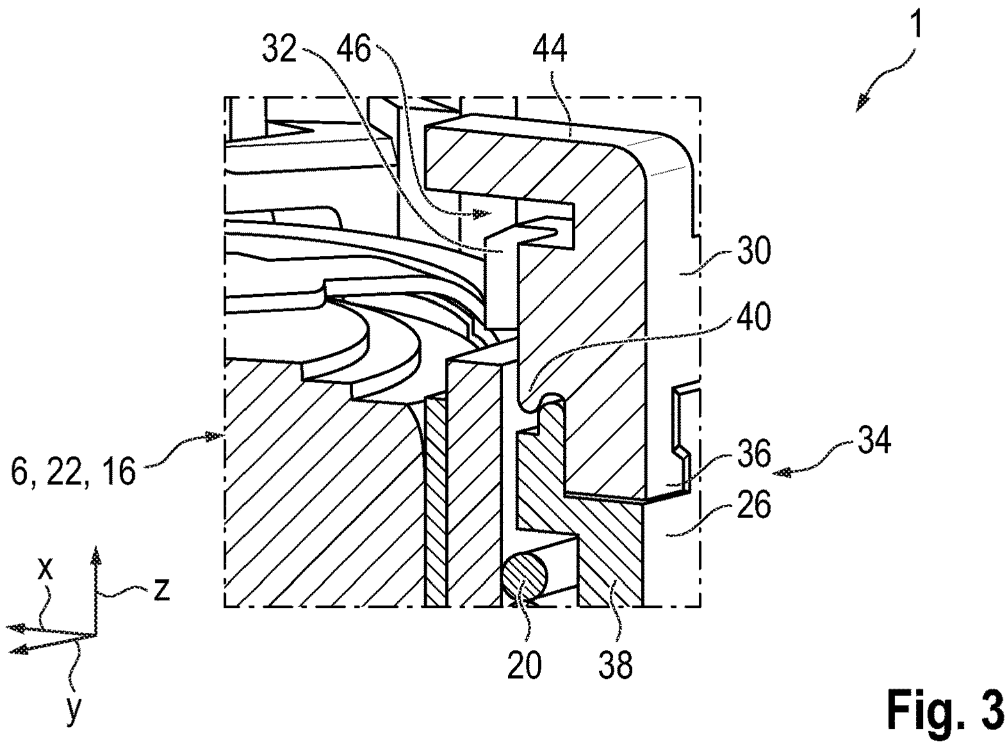
FIG. 3 is a partial sectional view of the electronics frame and the electronic component.
Figure 4:
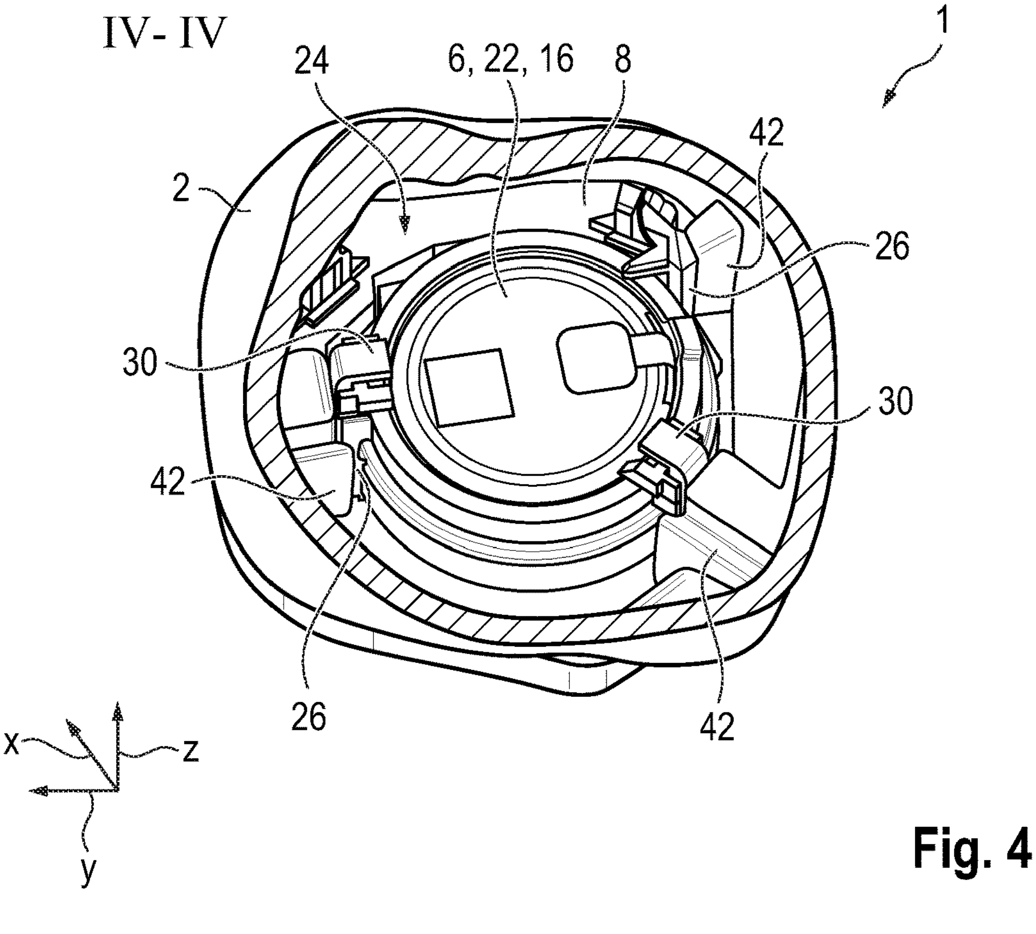
FIG. 4 is a partial sectional view taken along the section line IV-IV shown in FIG. 1 of the hearing device.

It is furthermore recognizable from the detail view in partial section shown in FIG. 3 that the respective frame lock 30 is locked on the holding finger 26. For this purpose, the T-groove 34 is delimited on the radial inside by a shoulder 38. The frame lock 30 has a catch lug 40, which "overlaps" or "snaps" over the shoulder 38 during the insertion into the T-groove 34, so that inadvertent displacement of the frame locks 30 radially outward is prevented.

To further secure the power module 22 in the x and y directions, the housing shell 2 has projections 42 on the inside, which are arranged corresponding to the holding fingers 26. In the installed state, the holding fingers 26 are supported on the rear side, thus against a bend away from the power module 22, against one of these projections 42 in each case. The holding fingers 26 thus only have to absorb traction forces to fix the power module 22 in the z direction. Forces in the x and y directions are introduced into the housing shell 2. The frame locks 30 are also supported against the projections 42.

Figure 2:
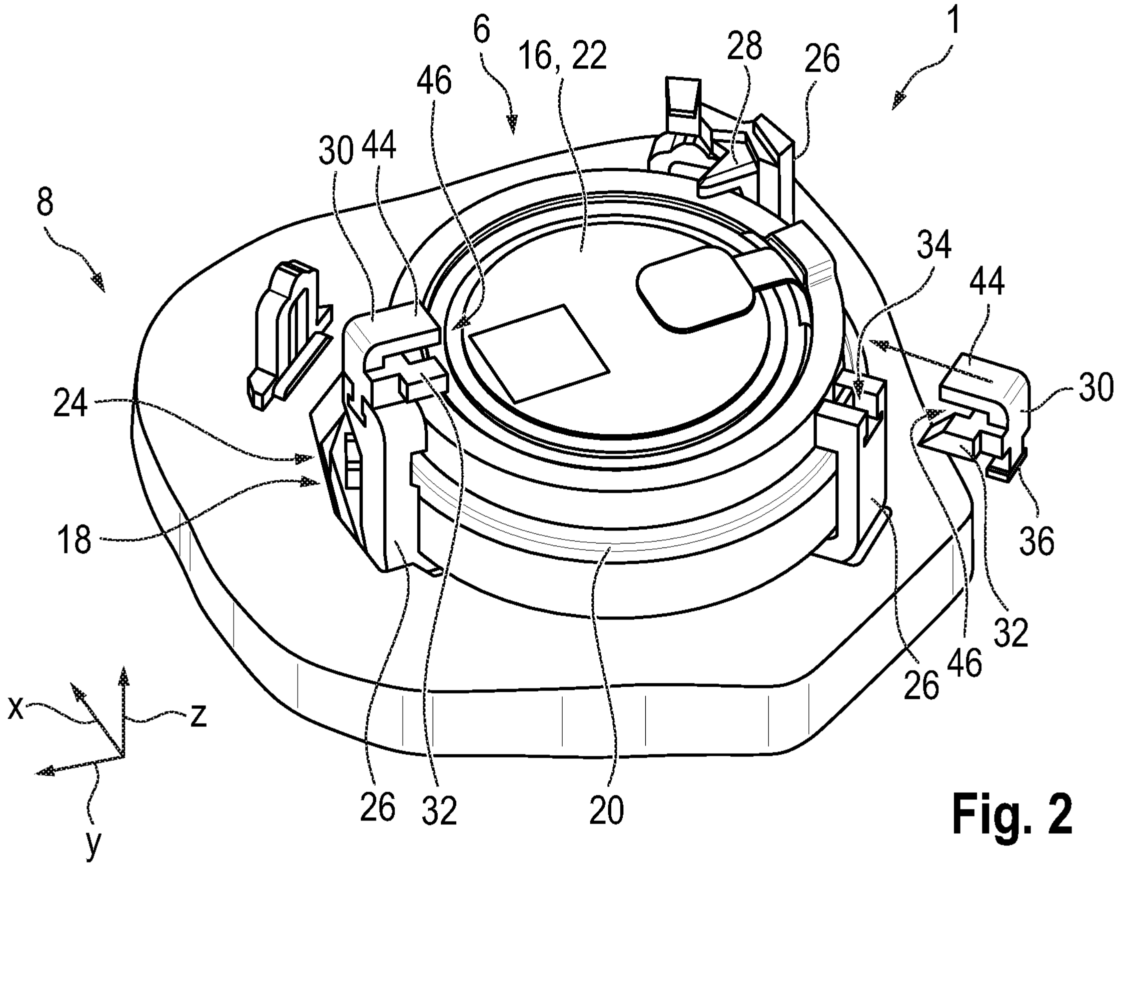
FIG. 2 is a diagrammatic, perspective view of a cover plate, an electronics frame, and an electronic component of the hearing device.
Figure 5:
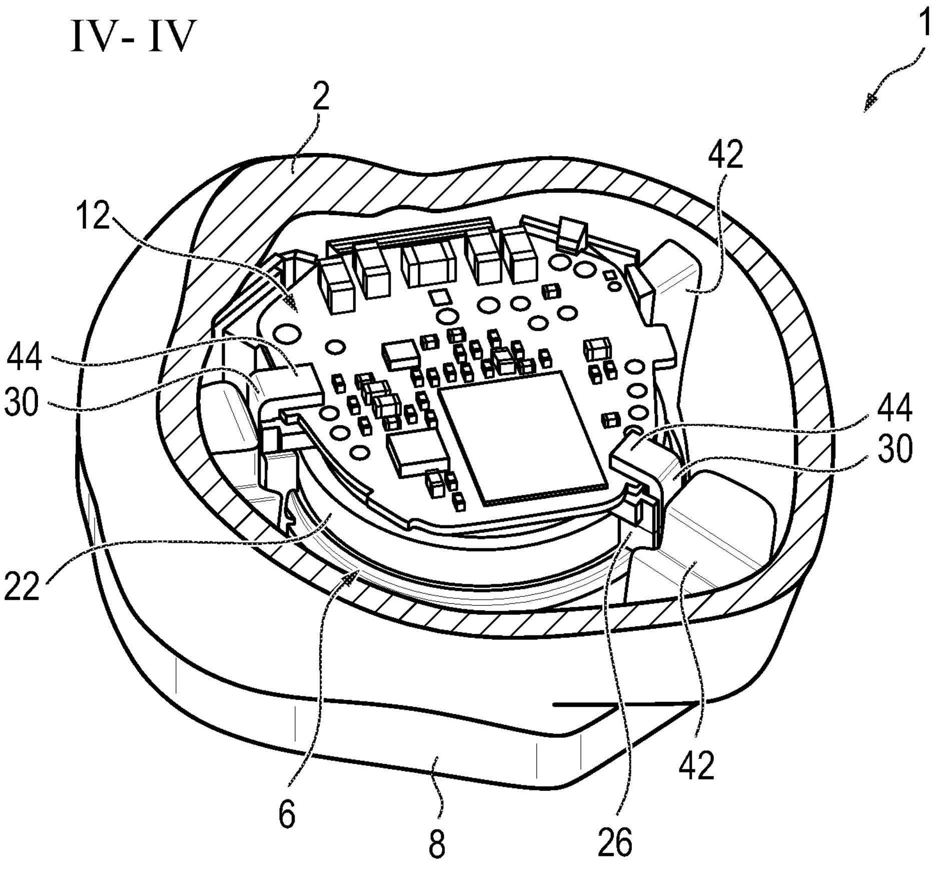
FIG. 5 is a frontal view of the hearing device according to FIG. 4.

As can be seen from FIGS. 2, 3, and 5, the frame locks 30 are configured in such a way that they can hold a further electronic component 6, specifically here the signal processing unit 12 in the form of a "motherboard". For this purpose, the frame locks 30 have a further holding lug 44 spaced apart in the Z direction from the holding lug 32, which forms a "holding claw" 46 with the holding lock 32. This holding claw 46 encompasses the motherboard on both sides in the z direction and holds it in position.

The subject matter of the invention is not restricted to the above-described exemplary embodiment. Rather, further embodiments of the invention can be derived by a person skilled in the art from the above description.

The following is a summary list of reference numerals and the corresponding structure used in the above description of the invention:

1 ITE
2 housing shell
4 electronics chamber
6 component
8 faceplate
10 microphone
12 signal processing unit
14 loudspeaker
16 secondary cell
18 charging electronics unit
20 antenna
22 power module
24 electronics frame
26 holding finger
28 holding lug
30 frame lock
32 holding lug
34 T-groove
36 T-base
38 shoulder
40 catch lug
42 projection
44 holding lug
46 holding claw

The invention claimed is:

1. A hearing device, comprising:
- a housing shell enclosing an electronics chamber like a cup;
- a cover plate connected to said housing shell to terminate said electronics chamber;
- an electrical and/or an electronic component;
- an electronics frame protruding from said cover plate into said electronics chamber and by means of said electronics frame said electrical and/or an electronic component of the hearing device is reversibly mounted at least in directions parallel to said cover plate; and
- at least one frame lock reversibly fixed on said electronics frame, by means of said at least one frame lock said electrical and/or electronic component is fixed on said electronics frame in a direction perpendicular to said cover plate.

2. The hearing device according to claim 1, wherein said electronics frame has a plurality of holding fingers, between which said electrical and/or electronic component is secured in the directions parallel to said cover plate.

3. The hearing device according to claim 2, wherein said electrical and/or electronic component is clamped between said plurality of holding fingers.

4. The hearing device according to claim 2, wherein said at least one frame lock is reversibly fixed on one of said plurality of holding fingers at an end of said one of said holding fingers.

5. The hearing device according to claim 4, wherein said at least one frame lock is fixed in a formfitting manner on said plurality of holding fingers in the direction perpendicular to said cover plate.

6. The hearing device according to claim 5, wherein said at least one frame lock is locked on said plurality of holding fingers.

7. The hearing device according to claim 4, wherein:
- said at least one frame lock is one of a plurality of frame locks; and
- at least two of said holding fingers each have one of said frame locks at an end of a respective one of said holding fingers.

8. The hearing device according to claim 4, wherein said at least one frame lock is fixed in by means of a dovetail-like connection on said plurality of holding fingers in the direction perpendicular to said cover plate.

9. The hearing device according to claim 2,
- wherein three of said holding fingers are provided;
- wherein said at least one frame lock is one of a plurality of frame locks, one of said frame locks is disposed on each of two of said three holding fingers; and
- further comprising at least one holding lug active in the direction perpendicular to said cover plate, under which said electrical and/or electronic component is inserted, being formed on another one of said holding fingers.

10. The hearing device according to claim 2, wherein said housing shell has projections on an inside, one of said projections is assigned to each of said holding fingers, against which a corresponding one of said holding fingers is supported.

11. The hearing device according to claim 2, wherein said at least one frame lock has a holding device for mounting a further electrical and/or electronic component.

12. The hearing device according to claim 1, wherein the hearing device is an in-the-ear hearing device.

13. The hearing device according to claim 10, wherein said holding device is a holding claw.

* * * * *